United States Patent
Moon et al.

(10) Patent No.: US 7,295,658 B2
(45) Date of Patent: **\*Nov. 13, 2007**

(54) SYSTEM AND METHOD FOR PROVIDING PREPAID TELECOMMUNICATION SERVICES

(75) Inventors: Eric E. Moon, Fort Lee, NJ (US); Johng Phil Lee, Palisades Park, NJ (US); Jae Heung Park, Fort Lee, NJ (US); Taesoon Kim, Fort Lee, NJ (US); Jong Phil Shin, Palisades Park, NJ (US); Han Kwang Cho, Hackensack, NJ (US)

(73) Assignee: Locus Telecommunications, Inc., Englewood Cliffs, NJ (US)

( * ) Notice: Subject to any disclaimer, the term of this patent is extended or adjusted under 35 U.S.C. 154(b) by 35 days.

This patent is subject to a terminal disclaimer.

(21) Appl. No.: 11/082,552

(22) Filed: Mar. 17, 2005

(65) Prior Publication Data

US 2005/0163294 A1    Jul. 28, 2005

Related U.S. Application Data

(63) Continuation of application No. 10/255,795, filed on Sep. 26, 2002, now Pat. No. 6,873,690.

(60) Provisional application No. 60/364,614, filed on Mar. 15, 2002.

(51) Int. Cl.
    *H04M 15/00* (2006.01)

(52) U.S. Cl. ............... 379/114.2; 379/114.15; 379/114.16; 379/127.01; 379/127.03

(58) Field of Classification Search ......... 379/111, 379/114.15–16, 114.2, 127.01, 127.03–127.04, 379/114.01, 115.02, 118, 120, 121.03, 114.05, 379/144.01, 144.05
See application file for complete search history.

(56) References Cited

U.S. PATENT DOCUMENTS

| | | |
|---|---|---|
| 3,676,597 A | 7/1972 | Peterson |
| 4,007,336 A | 2/1977 | Hutton, Sr. |
| 4,224,472 A | 9/1980 | Zarount |
| 4,446,337 A | 5/1984 | Cofer |
| 4,706,275 A | 11/1987 | Kamil |
| 4,879,744 A | 11/1989 | Tasaki et al. |
| 4,932,042 A | 6/1990 | Baral et al. |
| 4,935,956 A | 6/1990 | Hellwarth et al. |
| 5,007,077 A | 4/1991 | Fields et al. |
| 5,095,505 A | 3/1992 | Finucane et al. |
| 5,109,401 A | 4/1992 | Hattori et al. |

(Continued)

OTHER PUBLICATIONS

BigZoo.com, Inc.'s web page entitled "BigZoo-PIN-skip", http://pinskip.com.

(Continued)

*Primary Examiner*—Binh K. Tieu
(74) *Attorney, Agent, or Firm*—Greenberg Traurig, LLP

(57) ABSTRACT

The present invention relates to a system and method for providing prepaid telecommunication services. More particularly, prepaid telephone calls can be made by users without entering any access code, if such calls are made from telephone numbers previously registered in the telecommunication system in connection with valid access codes. Prepaid telephone calls can also be made from non-registered telephone numbers after providing the telecommunication system with a valid access code.

29 Claims, 11 Drawing Sheets

U.S. PATENT DOCUMENTS

| | | | |
|---|---|---|---|
| 5,119,415 | A | 6/1992 | Aoyama |
| 5,134,646 | A | 7/1992 | Carlson |
| 5,187,740 | A | 2/1993 | Swaim et al. |
| 5,353,335 | A | 10/1994 | D'Urso et al. |
| 5,367,566 | A | 11/1994 | Moe et al. |
| 5,438,615 | A | 8/1995 | Moen |
| 5,509,056 | A | 4/1996 | Ericsson et al. |
| 5,546,446 | A | 8/1996 | Tsunokawa et al. |
| 5,550,904 | A | 8/1996 | Andruska et al. |
| 5,563,934 | A | 10/1996 | Eda |
| 5,592,537 | A | 1/1997 | Moen |
| 5,719,926 | A | 2/1998 | Hill |
| 5,722,067 | A | 2/1998 | Fougnies et al. |
| 5,749,075 | A | 5/1998 | Toader et al. |
| 5,815,561 | A * | 9/1998 | Nguyen et al. ........ 379/115.01 |
| 5,825,863 | A | 10/1998 | Walker |
| 5,828,740 | A | 10/1998 | Khuc et al. |
| 5,844,972 | A | 12/1998 | Jagadish et al. |
| 5,854,975 | A | 12/1998 | Fougnies et al. |
| 5,864,604 | A | 1/1999 | Moen et al. |
| 5,991,380 | A | 11/1999 | Bruno et al. |
| 6,044,247 | A | 3/2000 | Taskett et al. |
| 6,157,823 | A | 12/2000 | Fougnies et al. |
| 6,188,752 | B1 * | 2/2001 | Lesley ................... 379/114.16 |
| 6,195,422 | B1 * | 2/2001 | Jones et al. ............ 379/127.05 |
| 6,208,851 | B1 | 3/2001 | Hanson |
| 6,226,364 | B1 | 5/2001 | O'Neil |
| 6,236,851 | B1 | 5/2001 | Fougnies et al. |
| 6,337,903 | B1 * | 1/2002 | Manner ................. 379/144.01 |
| 6,389,117 | B1 | 5/2002 | Gross et al. |
| 6,434,378 | B1 | 8/2002 | Fougnies |
| 6,453,029 | B1 | 9/2002 | Campbell |
| 6,453,031 | B2 | 9/2002 | Malik |
| 6,463,137 | B1 | 10/2002 | Vanjani et al. |
| 6,463,139 | B1 | 10/2002 | Davitt et al. |
| 6,516,056 | B1 | 2/2003 | Justice et al. |
| 6,785,372 | B1 * | 8/2004 | Moss et al. .............. 379/114.2 |
| 6,873,690 | B2 | 3/2005 | Moon et al. |
| 2001/0000808 | A1 | 5/2001 | Lesley |
| 2001/0009849 | A1 | 7/2001 | Hanson |
| 2001/0021648 | A1 | 9/2001 | Fougnies et al. |
| 2001/0028705 | A1 | 10/2001 | Adams et al. |
| 2002/0097854 | A1 | 7/2002 | Bauer |
| 2003/0043984 | A1 * | 3/2003 | Lauzon .................. 379/144.01 |

OTHER PUBLICATIONS

TeleCents Communications, "TotalCent" and "SmartCents", Printouts (twelve (12) pages) of www.telecents.com.

Net2phone, Inc.'s web page entitled "Net2Phone—Calling Cards", http://web.net2phone.com/consumer/callingcards/ (one (1) page).

Net2phone, Inc.'s web page entitled "Net2Phone—Net2Phone Direct Calling Card", http://web.net2phone.com/consumer/callingcards/net2phonedirect/ (one (1) page).

Net2phone, Inc.'s web page entitled "Net2Phone—Net2Phone Direct Calling Card—No-PIN Dialing", http://web.net2phone.com/consumer/callingcards/net2phonedirect/nopin.asp (one (1) page).

Net2phone, Inc.'s web page entitled "Welcome to Penny Talk", http://www.pennytalk.com/ (one (1) page).

Net2phone, Inc.'s web page entitled "Welcome to Penny Talk—Penny Talk with No-PIN Dialing", http://www.pennytalk.com/features.html (two (2) pages).

IDT Corporation's web page entitled "IDT Corporation—Products—Calling Cards—Global Call—Features and Advantages", http://www.idt.net/products/debit/gc/features.asp (three (3) pages).

IDT Corporation's web page entitled "IDT Corporation—Products—Global Access", http://www.idt.net/products/gaccess/ (one (1) page).

IDT Corporation's web page entitled "IDT Corporation—Products—Global Access—FAQ's", http://www.idt.net/products/gaccess/faq.asp (two (2) pages).

IDT Corporation's web page entitled "IDT Corporation—Products—Global Access—How to Use", http://www.idt.net/products/gaccess/howtouse.asp (two (2) pages).

Union Telecard Alliance's web page entitled "Cheapest International Prepaid Phone Cards, Calling Cards from UnionTelecard.com! Official Site", http://www.uniontelecard.com/ (two (2) pages).

Union Telecard Alliance's web page entitled "Fast Dial Phone Cards—Cheapest Prepaid Phone Cards for Calling India, China, South Korea, Nigeria, . . . ", http://www.uniontelecard.com/ProductDetail.asp?ProductID=7201&shopperid=3ce373e89b554081aa4b5a19d8b27cf4 (two (2) pages).

Union Telecard Alliance's web page entitled "Remember Me Phone Cards—Cheapest Prepaid Phone Cards for Calling India, China, South Korea, Nig . . . ", http://www.uniontelecard.com/ProductDetail.asp?ProductID=7202&shopperid=1c3dc7fc103a4c43974cc06c927e29b7 (two (2) pages).

Union Telecard Alliance's web page entitled "Arcade Phone Cards—Cheapest Prepaid Phone Cards for Calling India, China, South Korea, Nigeria, Br . . . ", http://www.uniontelecard.com/ProductDetail.asp?ProductID=7181&shopperid=f8408132ce544a43a60b36a094c93b71 (one (1) page).

Union Telecard Alliance's web page entitled "Super Quick Phone Cards—Cheapest Prepaid Phone Cards for Calling India, China, South Korea, Nigeri . . . ", http://www.uniontelecard.com/ProductDetail.asp?shopperid=0fdbe164c9ea4c0890854358f12017a4&ProductID=1501 (two (2) pages).

Cognidial Discount International Long Distance, CogniDial.com, Jul. 2, 2001, pp. 1-3.

PNG Discount Long Distance Services, Cognigen.net, Jul. 2, 2001, pp. 1-3.

* cited by examiner

| PIN CONVERSION TABLE | |
|---|---|
| | |
| | |
| | |

54 / FIG. 8A \ 52

| BALANCE TABLE | |
|---|---|
| [P1] | $10.00 |
| [P2] | $10.00 |
| [P3] | $10.00 |

46 / FIG. 8B \ 48

| PIN CONVERSION TABLE | |
|---|---|
| [A1] | [P1] |
| | |
| | |

54 / FIG. 9 \ 52

| PIN CONVERSION TABLE | |
|---|---|
| [A1] | [P1] |
| [A2] | [P1] |
| | |

54 / FIG. 10 \ 52

| PIN CONVERSION TABLE | |
|---|---|
| [A1] | [P1] |
| [A2] | [P1] |
| [P2] | [P1] |

54 / FIG. 11A \ 52

| BALANCE TABLE | |
|---|---|
| [P1] | $20.00 |
| [P2] | $0.00 |
| [P3] | $10.00 |

46 / FIG. 11B \ 48

SYSTEM AND METHOD FOR PROVIDING PREPAID TELECOMMUNICATION SERVICES

CROSS-REFERENCE TO RELATED APPLICATION

This application is a continuation of U.S. patent application Ser. No. 10/255,795 filed on Sep. 26, 2002. This application also claims the benefit of U.S. Provisional Patent Application No. 60/364,614 filed on Mar. 15, 2002.

FIELD OF THE INVENTION

The present invention relates to a system and method for providing telecommunication services and, more particularly, to a system and method for providing prepaid telephone calling services.

BACKGROUND OF THE INVENTION

Prepaid telephone calling cards have been in wide use for making local and long distance telephone calls. These calling cards are typically sold in fixed value increments (e.g., $10, $20, etc.) at various distribution centers, such as retail stores. Because prepaid telephone calling card services are accessed with access codes (i.e., personal identification numbers or PINs) and do not hence require coins, prepaid calling cards are especially convenient for making telephone calls from public pay phones.

In order to make a telephone call with a typical prepaid calling card, a designated access telephone number (e.g., an 1-800 telephone number) is dialed by the cardholder for accessing an associated computerized calling system. When the call is connected to the calling system, the cardholder is prompted to enter the access code or PIN printed on the calling card. If the access code is correctly entered, the call is connected to a desired destination telephone number, and an appropriate charge is deducted from the account or balance associated with the access code.

While prepaid calling cards have been popular, there is a need to make additional improvements to enhance their usefulness and convenience. For instance, because each prepaid telephone call requires the entry of an access code, call processing is delayed.

Various prepaid telecommunication systems and methods have been developed (see, for instance, U.S. Patent Publication No. U.S. 2001/0028705 A1 and U.S. Pat. Nos. 5,825,863, 6,188,752, 6,208,851 and 6,236,851). However, these systems and methods are believed to have limited applicability.

SUMMARY OF THE INVENTION

The present invention overcomes the disadvantages and shortcomings discussed above by providing an improved method for providing a prepaid telephone calling card service using a call processor including an account database which has account records corresponding to a plurality of prepaid accounts. More particularly, in accordance with this method, registered telephone numbers are stored in the database, each of the registered telephone numbers being associated with one of the accounts. A telephone call originating from a first telephone number is connected to the call processor. The call processor then determines whether the first telephone number corresponds to one of the registered telephone numbers. If the first telephone number corresponds to one of the registered telephone numbers, the call is connected to a second telephone number provided during the call. The present invention also provides a prepaid calling card system for performing the functions discussed above.

BRIEF DESCRIPTION OF THE DRAWINGS

For a more complete understanding of the present invention, reference is made to the following detailed description of an exemplary embodiment considered in conjunction with the accompanying drawings, in which:

FIG. 8A is a simplified representation of a PIN conversion database table contained in the telecommunication system illustrated in FIG. 1;

FIG. 8B is a simplified representation of a balance database table contained in the telecommunication system illustrated in FIG. 1;

FIGS. 9-11B are schematic illustrations of the PIN conversion table and the balance table shown in FIGS. 8A and 8B, respectively, during the operation of the telecommunication system;

DETAILED DESCRIPTION OF THE INVENTION

A prepaid telecommunication system and method in accordance with the present invention will be discussed in detail hereinafter. In this regard, it should be noted that the following discussion is illustrative of the present invention and is not meant to limit the scope of the present invention.

Figure 1:
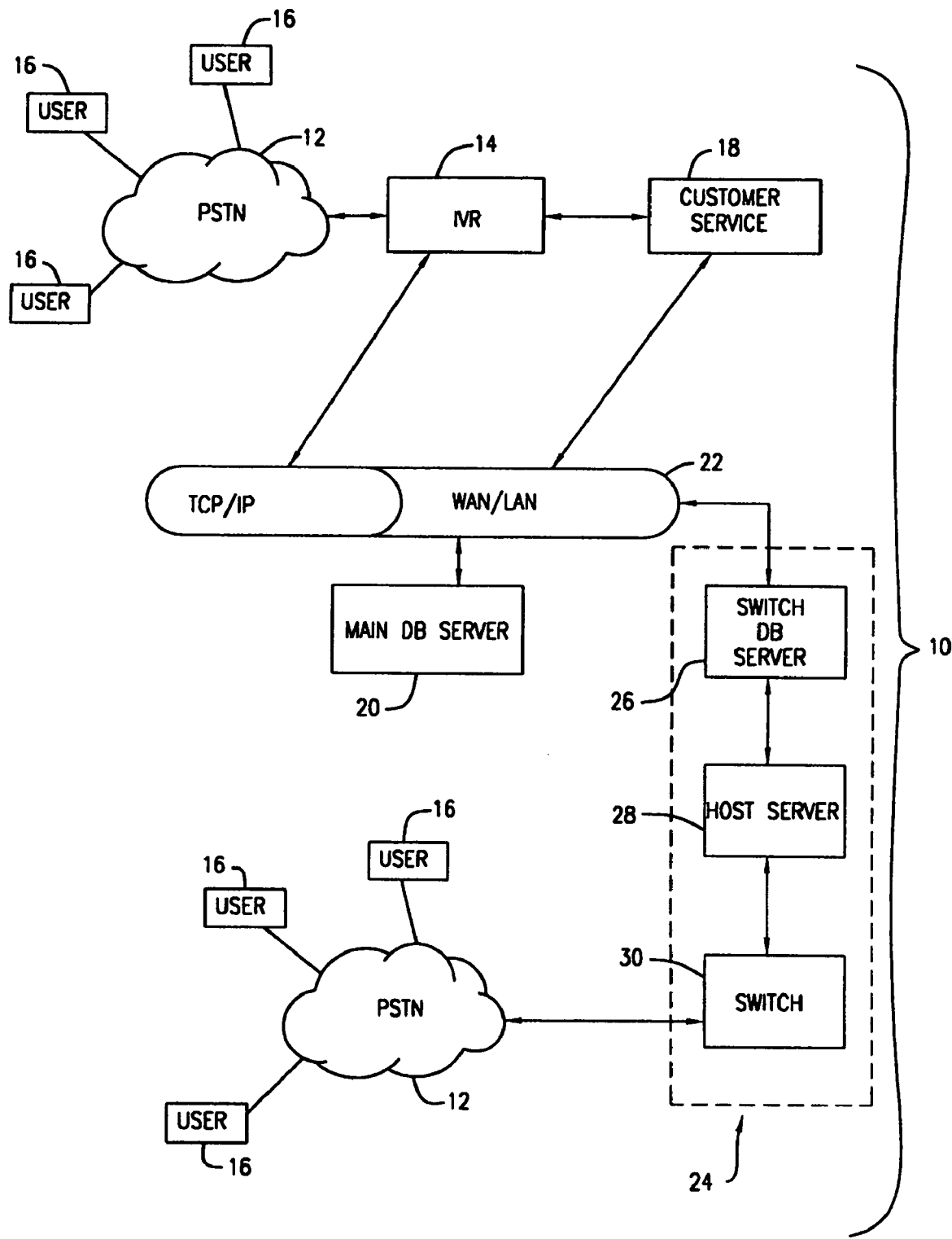
FIG. 1 is a schematic illustration of a prepaid telecommunication system in accordance with the present invention.

Referring to FIG. 1, a prepaid telecommunication system (e.g., a call processor) 10 in accordance with the present invention is connected to a public switch telephone network 12 (hereinafter "the PSTN") and includes an interactive voice response unit 14 (hereinafter "the IVR unit"). As is conventional in the telecommunication field, telecommunication devices 16, such as private telephones, public pay phones, mobile or cellular phones, etc., are connected to the PSTN 12, which include local exchanges (not shown), such that the IVR unit 14 can be accessed from the telecommunication devices 16. The IVR unit 14 is programmed to perform a number of automated customer service functions, such as origination number registration, balance replenishment, etc., as will be discussed in greater detail hereinafter. A customer service center 18 is connected to the IVR unit 14 via a local or wide area network so that customer service representatives can provide personal or manual assistance to users of the telecommunication system 10.

A main database server 20 is also provided for storing an account database containing prepaid account records, which will be discussed in greater detail hereinbelow. The main database server 20, which is constructed in a manner similar to that of a main database server used in a conventional prepaid telephone calling card system, is connected to the IVR unit 14 via a local or wide area network 22 (e.g., a TCP/IP based WAN/LAN). In this manner, data can be transmitted between the IVR unit 14 and the main database server 20 for the performance of automated customer service functions by the IVR unit 14.

Still referring to FIG. 1, the telecommunication system 10 also includes a switch unit 24, which is constructed and operates in a manner similar to that of a switch unit of a conventional prepaid telephone calling card system. More particularly, the switch unit 24, which is adapted to receive and connect prepaid telephone calls to requested destination numbers, includes a switch database server 26, a host server 28 and a switch 30. The switch database server 26 and the main database server 20 are interconnected to each other so that data can be transmitted therebetween. For instance, account records can be downloaded from the main database server 20 and stored and/or updated locally in the switch database server 26 for use by the switch unit 24 in providing prepaid telecommunication services. The account records stored and/or updated locally in the switch database server 26 can be uploaded periodically onto the main database server 20 for synchronizing the main database server records to the local switch database server records and vice versa. In this manner, when the telecommunication system 10 is equipped with multiple switch units, call processing can be conducted "locally" in each switch unit. As is conventional, the switch 30 is connected to the PSTN 12 for connecting prepaid telephone calls to requested destination numbers.

The telecommunication system 10 permits its users to make prepaid telephone calls either with or without an access code (i.e., a personal identification number or PIN), depending upon where the calls are made from. As used herein, the term "prepaid PINless calling" or "prepaid PINless call" shall denote the process of making a prepaid telephone call without the entry of a PIN, while the term "prepaid PIN calling" or "prepaid PIN call" shall denote the process of making a prepaid telephone call with a PIN (i.e., after the entry of a PIN). In order to make prepaid PINless calls from desired telephone numbers (referred to hereinafter as "origination numbers"), such as home telephone lines, office telephone lines, etc., the user needs to register such telephone numbers with the telecommunication system 10. Prepaid PIN calls can be made from any non-registered telephone numbers or lines (e.g., public pay phones) in a conventional manner.

Figure 7:
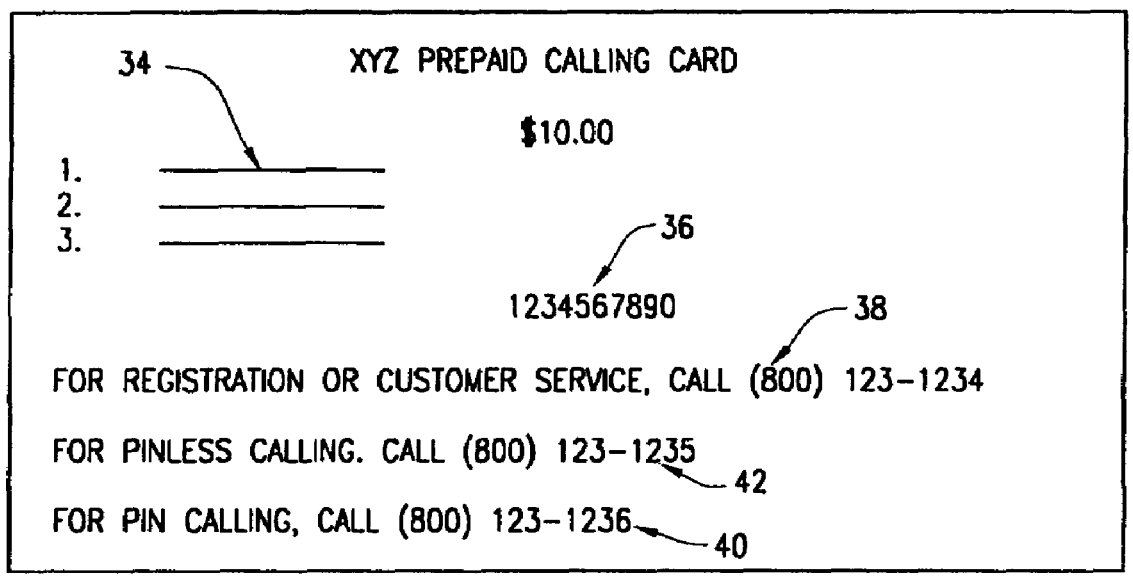
FIG. 7 is a schematic illustration of a telephone calling card adapted for use in connection with the telecommunication system illustrated in FIG. 1.

With reference to FIG. 7, prepaid telephone calling cards 32 having predetermined values (e.g., $10.00) are sold by vendors or distributors. Alternatively, the telephone calling cards 32 can be distributed free of charge for promotional purposes. The telephone calling cards 32 have appropriate instructions 34 for accessing the telecommunication system 10. In this regard, each of the telephone calling cards 32 includes an access code 36 (i.e., a personal identification number or PIN). Each of the telephone calling cards 32 also includes a registration telephone number 38 for use by the cardholder in registering a desired origination number (i.e., a telephone number from which the cardholder wishes to make prepaid PINless calls). The registration telephone number 38 can also be used to access customer-related services (e.g., changing the registered origination number, replenishing the balance of his or her calling card, accessing a customer service representative, etc.). Each calling card 32 also has a PIN access telephone number 40 and a PINless access telephone number 42. More particularly, the PIN access telephone number 40 is to be used by the cardholder for making prepaid PIN calls, while the PINless access telephone number 42 is to be used by the cardholder for making prepaid PINless calls.

In accordance with the present invention, account records relating to each issued calling card 32 are stored in the main database server 20 and/or the switch database server 26 so that they can be accessed when a prepaid telephone call is made by the cardholder. For instance, the account records include a balance database table 44 (see FIG. 8B) having a PIN column or field 46, which contains a list of PINs (e.g., P1, P2, P3) associated with issued calling cards 32, and a balance column or field 48, which contains balances corresponding to the PINs P1, P2, P3 listed in the PIN column 46. Each time a call is made through the telecommunication system 10 in connection with a particular PIN, the telecommunication system 10 deducts an appropriate charge from the corresponding balance in a manner similar to those of conventional prepaid telephone calling card systems.

Now referring to FIG. 8A, the account records also include a PIN conversion database table 50 having a registration number column or field 52 and an ANI/PIN column or field 54. When a cardholder uses his or her PIN (e.g., P1) to register an origination number A1 (i.e. a telephone number from which a user wishes to make prepaid PINless calls), the origination number A1 is added to the ANI/PIN column 54 by the main database server 20 (see FIG. 9). The PIN P1 is also entered into the registration number column 52 by the main database server 20 as a key identifier or a registration number such that the registered origination number A1 can be corresponded to the PIN P1, as will be discussed in greater detail hereinafter.

The account records of the main database server 20 and/or the switch database server 26 can also contain other information conventional in the prepaid telephone calling card field. For instance, the account records can include a rate chart, which can be part of the balance table 44 or the PIN conversion table 50 or can be a separate table.

Having discussed various components of the telecommunication system 10, automated (e.g., computerized) processes utilized by the telecommunication system 10 in providing prepaid telecommunication services will be discussed in detail hereinbelow.

The Origination Number Registration Process

When a telephone calling card 32 (see FIG. 7) is obtained or received by a user or customer, an origination number A1 needs to be registered in the telecommunication system 10 in order to make PINless calls from that origination number A1. While any desired origination numbers can be registered with the telecommunication system 10, for security reasons, telephones or telephone lines which are not generally accessible by third parties (e.g., home telephones, office telephones, personal mobile or cellular phones, etc.) are particularly suitable for registration.

Figure 2:
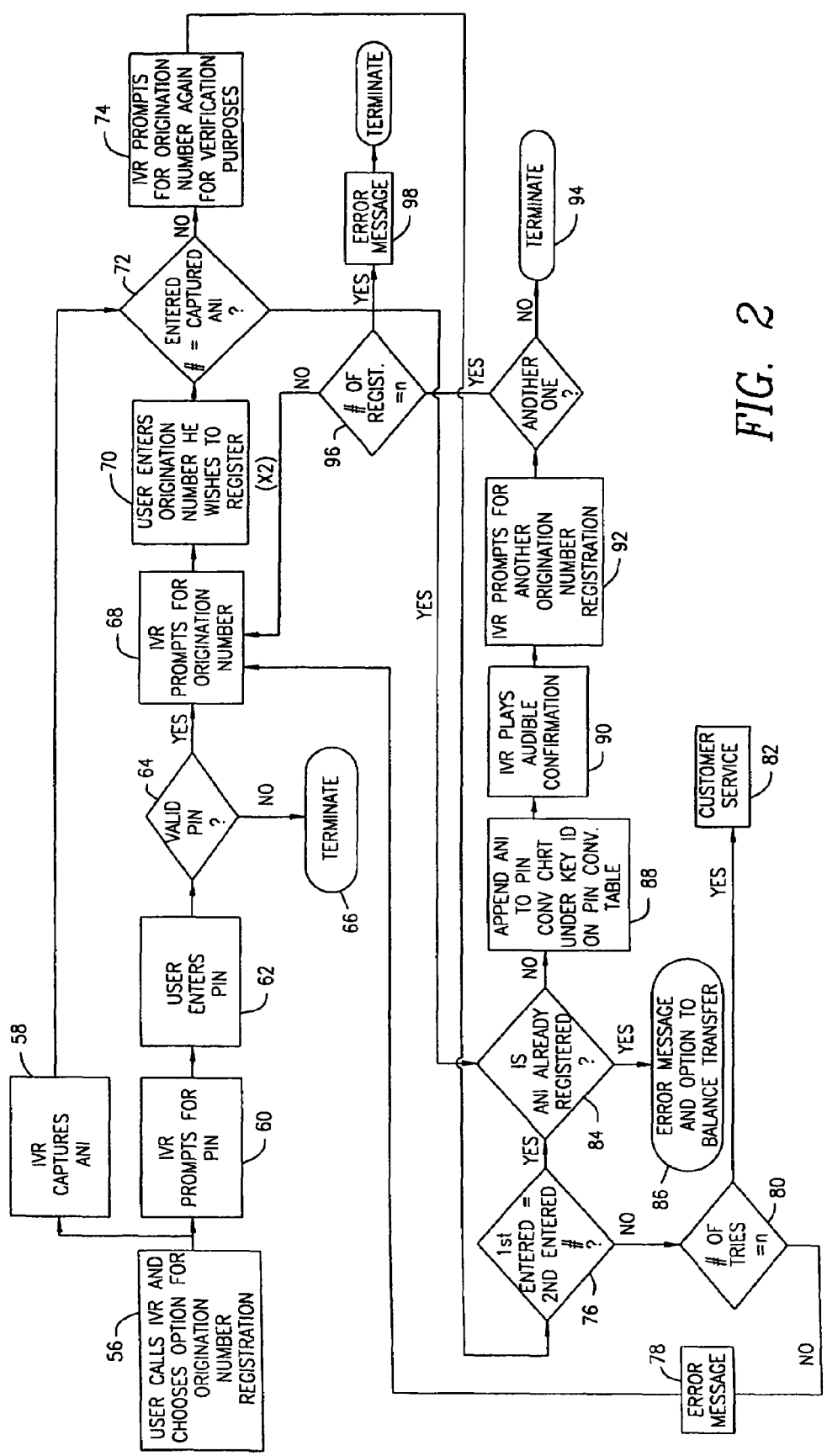
FIG. 2 is a schematic flow chart illustrating a registration process of the present invention for registering a desired telephone number in the telecommunication system.

Now referring to FIGS. 1 and 2, in order to register a desired origination number A1, the cardholder dials the registration telephone number 38 (see FIG. 7) from any phone (e.g., a home phone line or a public pay phone) to access the IVR unit 14 of the telecommunication system 10. When the call is connected to the IVR unit 14, the caller is prompted with various options, including an option for origination number registration. The caller then selects the origination number registration option (step 56). The IVR unit 14 also captures the automatic number identification code (hereinafter "ANI") of the telephone number or line from which the call originates in a conventional manner (step 58). The caller is then prompted to enter the PIN P1 appearing on his or her calling card (step 60). When the PIN P1 is entered by the caller (step 62), the IVR unit 14 sends the entered PIN P1 to the main database server 20 via the WAN/LAN 22. The main database server 20 then checks its database to determine whether the entered PIN P1 is valid in a conventional manner (step 64). If the entered PIN P1 is determined to be an invalid PIN (i.e., the entered PIN P1 does not correspond to any PIN stored in the main database server 20), an appropriate error message (e.g., "YOUR PIN IS INVALID") is played by the IVR unit 14, and the call is terminated (step 66).

Assuming that the entered PIN P1 is a valid PIN (i.e., the entered PIN P1 corresponds to a PIN stored in the main database server 20), the IVR unit 14 prompts the caller to enter a desired origination number A1 at step 68 (i.e., the telephone number the caller wishes to register for making prepaid PINless calls). After the entry of the origination number A1 by the caller (step 70), the entered origination number A1 is compared to the detected ANI by the IVR unit 14 (step 72). If the entered origination number A1 corresponds to the detected ANI (e.g., if the call is made from the entered origination number A1), the main database server 20 performs registration steps to be discussed hereinafter. If, on the other hand, the entered origination number A1 does not correspond to the detected ANI (e.g., if the call is made from a telephone number or line other than the entered origination number A1, if the ANI is not detected by the IVR unit 14, etc.), the IVR unit 14 prompts the caller to re-enter the origination number for verification purposes (step 74). The IVR unit 14 then determines whether the originally entered origination number corresponds to the subsequently entered origination number (step 76). In the event that the subsequently entered origination number does not correspond to the originally entered origination number, an appropriate error message (e.g., "THE ENTERED ORIGINATION NUMBER IS INVALID") is played by the IVR unit 14 (step 78), and the caller is routed back to the origination number entering step 68. If, after a predetermined number of tries, the caller is still unable to provide the IVR unit 14 with an origination number that is properly verified with a subsequently entered origination number (step 80), the call is routed to a customer service representative for manual registration (step 82).

Still referring to FIG. 2, if the entered origination number A1 corresponds to the captured ANI at step 72 or if the subsequently entered origination number corresponds to the originally entered origination number at step 76, the IVR unit 14 transmits the entered origination number A1 to the main database server 20. The main database server 20 then checks the PIN conversion table 50 (see FIG. 8A) containing a database of registered origination numbers to determine whether the entered origination number A1 is already registered in connection with any PIN (step 84). This checking step is performed so as to prevent an origination number from being registered in connection with multiple PINS, simplifying the administration of prepaid telephone calling card services (e.g., if a prepaid call is made from an origination number registered in connection with two or more PINS, the caller needs to be prompted with the option of selecting a desired PIN, thereby complicating the calling process). If the entered origination number A1 is an already registered number, an appropriate error message (e.g., "YOUR ORIGINATION NUMBER IS ALREADY REGISTERED") is played by the IVR unit 14 (step 86). The caller is then asked whether he or she wishes to replenish his or her account and is routed to account replenishment steps to be discussed hereinafter.

With reference to FIGS. 2 and 9, if the main database server 20 determines at step 84 that the entered origination number A1 is not a previously registered number, it enters or creates an appropriate record in the PIN conversion table 50 (step 88). More particularly, the main database server 20 appends the entered origination number A1 to the ANI/PIN column 54 of the PIN conversion table 50. The main database server 20 also appends the entered PIN P1 to the registration number column 52 of the PIN conversion table 50 as a registration number or key identifier for the registered origination number A1. An appropriate confirmation message is then played by the IVR unit 14 to inform the caller that the origination number A1 has successfully been registered (step 90).

After the confirmation message is played by the IVR unit 14, the caller is asked by the IVR unit 14 whether he or she wishes to register another origination number (e.g., an office telephone number) in connection with the same PIN P1 (i.e., the registration number or the key identifier) at step 92. If the caller chooses not to do so, the call is terminated (step 94).

Assuming that the caller chooses the option of registering another origination number, the main database server 20 checks the total number of origination numbers registered in connection with the registration number (i.e., the PIN P1) at step 96. If the total number of registered origination numbers is greater than a predetermined number, an appropriate error message is played by the IVR unit 14 (step 98), and the call is terminated. This checking process is conducted in order to limit the total number of origination numbers registerable in connection with any one registration number for the purpose of facilitating the administration of prepaid telephone calling card services. Alternatively, this checking process can be eliminated.

At step 96, if the total number of registered origination numbers does not exceed a predetermine number, the call is routed back to the step 68 of prompting for the entry of an origination number. Upon successful registration of another origination number A2, the main database server 20 appends same to the ANI/PIN column 54 of the PIN conversion table 50 (see FIG. 10). The main database server 20 also appends the associated registration number (i.e., the PIN P1) to the registration number column 52 of the PIN conversion table 50 (see FIG. 10). An appropriate confirmation message is then played by the IVR unit 14 to inform the caller that the origination number A2 has been successfully registered (step 90).

The Pinless Calling Process

Figure 3:
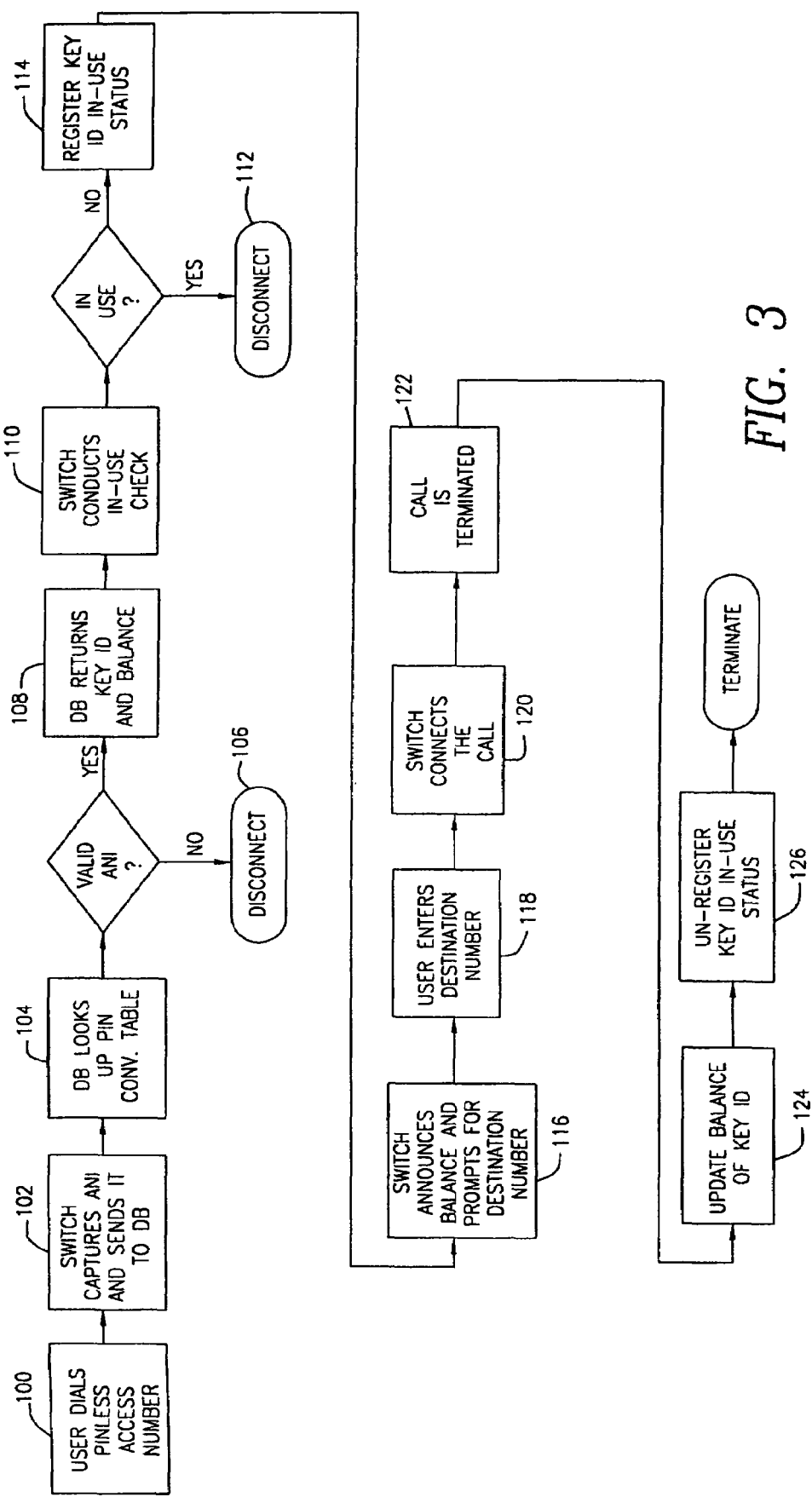
FIG. 3 is a schematic flow chart illustrating a calling process of the present invention without the entry of an access code.

With reference to FIGS. 1 and 3, after the successful registration of one or more origination numbers, the registered phone or phone line is ready for prepaid PINless calling. In order to make a prepaid PINless call, the caller dials the PINless access telephone number 42 (see FIG. 7) from the registered phone or phone line (i.e., the registered origination number A1 or A2) and the call is routed to the switch 30 via the PSTN 12 (step 100). When the call is connected to the switch 30, the ANI of the registered phone or phone line is captured by the switch 30 in a conventional manner and is transmitted to the switch database server 26 (step 102). The switch database server 26 then compares the captured ANI to the records contained in the ANI/PIN column 54 of the PIN conversion table 50 (see FIG. 10), which is downloaded from the main database server 20, for verification purposes (step 104). If the captured ANI does not correspond to any registered origination numbers, an appropriate error message (e.g., "YOUR TELEPHONE IS NOT REGISTERED FOR THIS SERVICE") is played by the switch 30, and the call is disconnected (step 106) or routed to the IVR unit 14 for origination number registration. If, on the other hand, the captured ANI corresponds to a registered origination number A1 or A2, the switch database server 26 transmits the corresponding key identifier P1 (i.e., the PIN P1 corresponding to the registered origination number A1 or A2 in the PIN conversion table 50) to the switch 30 along with the account balance associated therewith (step 108).

Upon receiving the key identifier P1 and the balance from the switch database server 26, the host server 28 conducts an "in-use" check for the purpose of determining whether the received key identifier P1 is in use (i.e., whether another call is in progress using the same key identifier P1) at step 110. If the key identifier is in use, an appropriate error message (e.g., "YOUR PIN IS IN USE") is played by the switch 30, and the call is disconnected (step 112). The "in-use" check is a administrative and/or security feature, preventing the cardholder from making multiple calls using the same PIN P1 at the same time. Alternatively, the "in-use" check step 110 can be eliminated.

Still referring to FIGS. 1 and 3, if the host server 28 determines that the returned key identifier P1 is not in use, it registers the key identifier P1 as being in use so as to block any subsequent prepaid calls using the key identifier P1 (step 114) while the current call is in progress. The switch 30 then informs the caller of the available account balance corresponding to the key identifier P1, and prompts the caller to enter a destination telephone number (step 116). After the entry of a destination telephone number by the caller (step 118), the switch 30 dials the entered destination telephone number and then connects the caller to the destination telephone number in a conventional manner (step 120). When the call is terminated at step 122 (e.g., by the caller), the switch database server 26 updates the balance corresponding to the key identifier P1 (step 124) and removes the key identifier P1 from the registry of key identifiers that are in use (i.e., unblocks the key identifier P1 for subsequent use) at step 126. The call can also be terminated by the switch unit 24 in a conventional manner (e.g., when the balance runs out).

The PIN Calling Process

Figure 4:
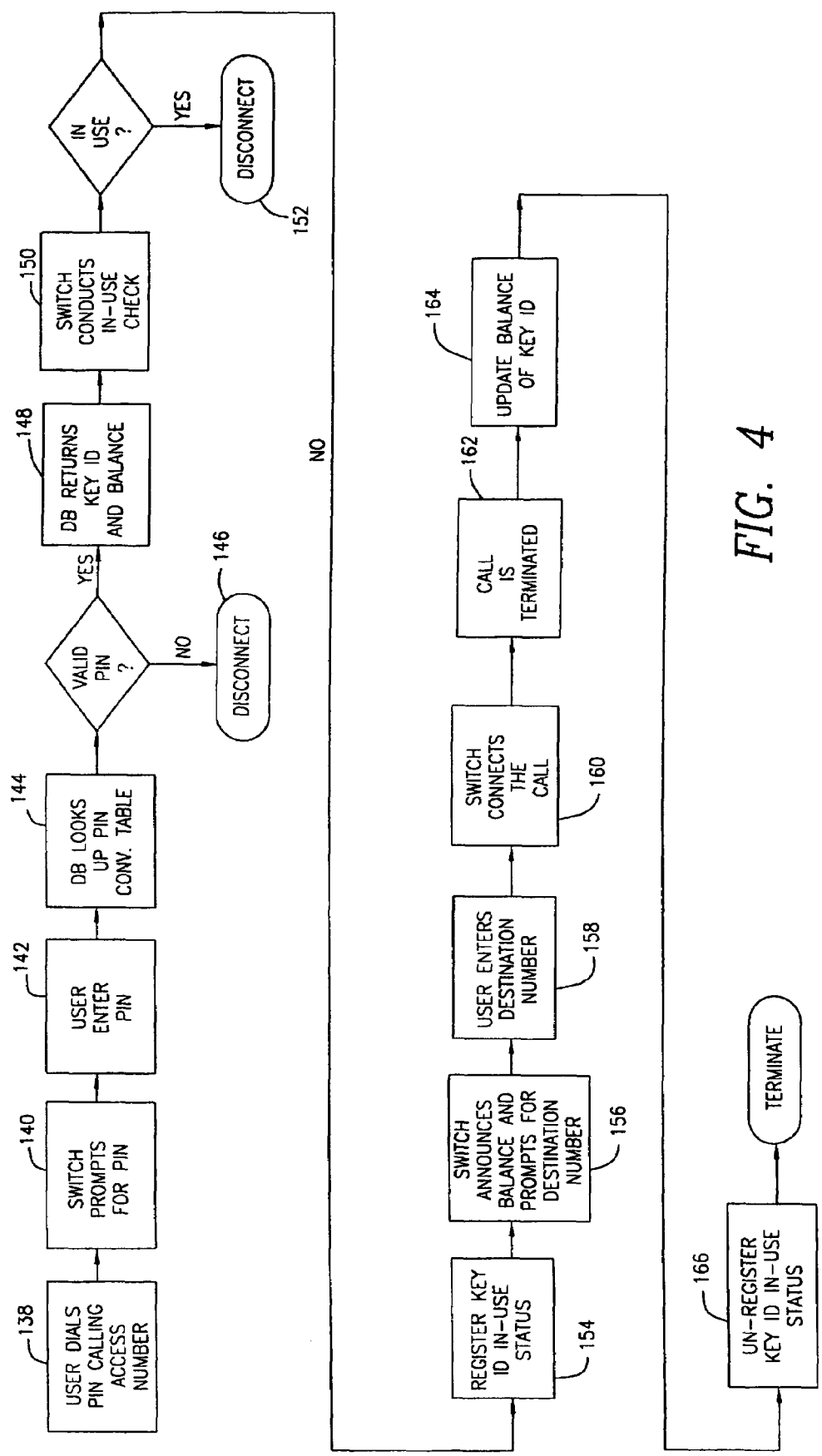
FIG. 4 is a schematic flow chart illustrating a calling process of the present invention requiring the entry of an access code.

Now referring to FIGS. 1 and 4, in order to make a prepaid PIN call from a non-registered phone or phone line, the caller dials the PIN access telephone number 40 (see FIG. 7), and the call is routed to the switch 30 via the PSTN 12 (step 138). When the call is connected to the telecommunication system 10, the switch 30 prompts the caller to enter his or her PIN (step 140). After the entry of a PIN by the caller (step 142), the switch database server 26 compares the entered PIN to its database (e.g., the PIN conversion table 50) in a conventional manner for the purpose of determining whether the entered PIN is valid (step 144). If the entered PIN is invalid (i.e., it does not correspond to any of the PINs stored in the PIN conversion table 50 or the balance table 44), an appropriate error message is played by the switch 30, and the call is disconnected (step 146). If, on the other hand, the entered PIN is a valid PIN (i.e., it corresponds to a PIN stored in the PIN conversion table 50 or the balance table 44), the switch database server 26 transmits the key identifier (e.g., the PIN P1) to the switch 30 along with the corresponding account balance (step 148).

Upon receiving the key identifier and the balance from the switch database server 26, the host server 28 conducts an "in-use" check on the received key identifier (step 150). If the received key identifier is in use (i.e., if another prepaid call is in progress using the same key identifier), an appropriate error message is played by the switch unit 24, and the call is disconnected (step 152). If, on the other hand, the key identifier is not in use, the host server 28 registers the key identifier as being in use so as to block subsequent prepaid calls while the current call is in progress (step 154). The switch 30 then informs the caller of the available account balance and prompts the caller to enter a destination telephone number (step 156). After the entry of a destination number (step 158), the switch 30 dials the destination number and connects the caller to the destination number (step 160). When the call is terminated (e.g., by the caller) at step 162, the switch database server 26 updates the available balance (step 164) and removes the key identifier from the registry of key identifiers that are in use (i.e., unblocks the key identifier) at step 166.

The Balance Transfer Process

The telecommunication system 10 allows cardholders to replenish the balance of their calling cards by way of balance transfers. More particularly, the telecommunication system 10 allows a cardholder to transfer the balance of a calling card to the balance of a previously registered PIN or key identifier (i.e., a PIN which has been used to register one or more origination numbers). In this manner, the balance of the registered PIN can be continuously replenished, and the PINless calling feature set up in connection with the registered PIN can be maintained. In other words, when the balance of the registered PIN runs out, it is not necessary to purchase a new card and set up the same PINless calling feature with the new card. The balance of a previously registered PIN or key identifier can also be replenished using methods that are conventional in the prepaid telephone calling card field (e.g., replenishment by credit card).

Figure 5:
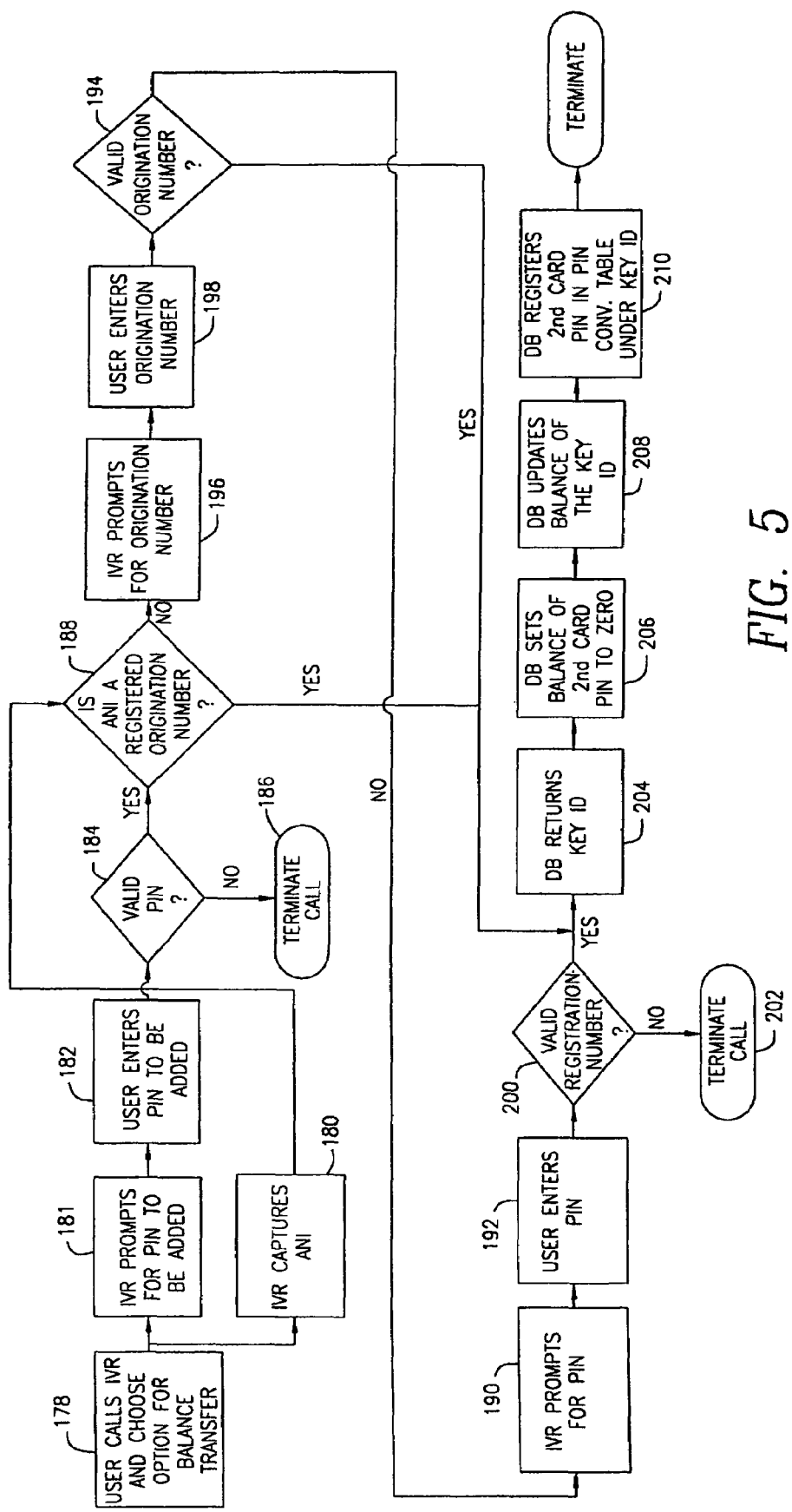
FIG. 5 is a schematic flow chart illustrating a balance transfer process of the present invention.

With reference to FIG. 5, in order to transfer the balance of a calling card to the balance of a registered PIN (e.g., the PIN P1 in FIG. 10), the cardholder calls the registration access telephone number 38 (see FIG. 7) from either a registered phone or a non-registered phone (step 178). When the call is connected to the IVR unit 14, the ANI of the telephone number from which the call originates is captured by the IVR unit 14 and then sent to the main database server 20 (step 180). After selecting the balance transfer option, the caller is prompted by the IVR unit 14 at step 181 to enter the PIN (e.g., the PIN P2 in FIG. 8B) of a calling card which the caller wishes to transfer balance from (referred to hereinafter as "the balance transfer card"). When the PIN P2 of the balance transfer card is entered by the caller (step 182), it is transmitted by the IVR unit 14 to the main database server 20 for authentication (step 184). If the entered PIN P2 is an invalid PIN (i.e., if the entered PIN P2 does not correspond to a PIN stored in the main database server 20), the caller is prompted with an appropriate error message by the IVR unit 14, and the call is terminated (step 186).

Assuming that the entered PIN P2, at step 184, is determined to be a valid PIN having a sufficient balance, the main database server 20 compares the captured ANI to the ANI/

PIN column 54 of the PIN conversion table 50 (step 188). If the captured ANI corresponds to a registered origination number (i.e., if the call is made from a registered phone), the telecommunication system 10 proceeds to balance transfer steps to be discussed hereinafter. Otherwise, the IVR unit 14 prompts the caller to enter a previously registered PIN (i.e., the registration number or key identifier) at step 190. After the entry of the registered PIN P1 by the caller (step 192), the main database server 20 compares the entered registered PIN P1 to the registration number column 52 of the PIN conversion table 50 (see FIG. 10) at step 194. If the entered registered PIN P1 is a valid registration number, the telecommunication system 10 proceeds to balance transfer steps to be discussed hereinafter.

If, at step 194, the entered PIN P1 is determined to be an invalid registration number, the IVR unit 14 prompts the caller to enter his or her registered origination number (i.e., the origination number the caller previously registered) at step 196. In response to the entry of an origination number (e.g., the origination number A1 in FIG. 10) at step 198, the IVR unit 14 transmits the entered origination number A1 to the main database server 20, which compares the entered origination number A1 to the ANI/PIN column 54 of the PIN conversion table 50 to check whether the entered origination number A1 is a registered origination number (step 200). If the entered origination number A1 is not a registered origination number, the IVR unit 14 prompts the caller with an appropriate error message and terminates the call (step 202).

Referring back to steps 188, 194 and 200, if the captured ANI is a registered ANI (step 188), if the entered registration number P1 is a valid registration number (step 194) or if the entered origination number A1 is a registered origination number (step 200), the main database server 20 retrieves the corresponding key identifier (i.e., the corresponding PIN P1 contained in the registration number column 52 of the PIN conversion table 50) at step 204. The main database server 20 then updates the balance table 44 by setting the balance of the PIN P2 of the balance transfer card to zero at step 206 (see FIG. 11B) and increasing the balance of the key identifier P1 by an appropriate amount at step 208 (see FIG. 11B). The main database server 20 then registers the PIN P2 of the balance transfer card to the ANI/PIN column 54 of the PIN conversion table 50 and associates same with the key identifier P1 in the registration number column 52 at step 210 (see FIG. 11A).

When the PIN P2 of the balance transfer card (hereinafter "the added PIN P2") is registered in the PIN conversion table 50, even though its corresponding balance in the balance table 44 is zero, the user can continue to use same in making prepaid PIN calls. More particularly, when the added PIN P2 is entered to make a prepaid PIN call (see step 142 in FIG. 4), the switch database server 26 searches through the PIN conversion table 50 to locate the added PIN P2. When the added PIN P2 is located in the ANI/PIN column 54 of the PIN conversion table 50, the key identifier P1 (i.e., the originally registered PIN P1) and the balance associated therewith are retrieved by the switch database server 26 for call processing.

It should be noted that the balance transfer process illustrated in FIG. 5 can be modified in numerous ways. For instance, if the captured ANI does not correspond to a registered origination number at step 188, the caller can be prompted to enter his or her registered origination number (see step 196 in FIG. 5A) rather than a previously registered PIN (i.e., a registration number or key identifier). Since it is easier for the cardholder to remember the registered origination number (e.g., his or her home or office telephone number), this modification enhances the user-friendliness of the telecommunication system 10. If the origination number entered by the caller corresponds to a registered origination number contained in the database (see steps 196, 198, 200 in FIG. 5A), the main database 20 retrieves the corresponding key identifier (see step 204). The switch unit 24 and/or the main database server 20 then check their records to determine that the prepaid account corresponding to the PIN entered at step 182 (i.e., the PIN of the balance transfer card) is in current use or has been in use previously (step 205). If the account of the balance transfer card is not in current use and has not been in use previously (step 207), the balance updating steps 206, 208, 210 can be performed as discussed above. The "in-use" and "in-previous-use" checks conducted at step 205 are security features preventing the transfer of the balance of the balance transfer card if it is in current use or if it has been used previously. Alternatively, the "in-use" and "in-previous-use" checks can be eliminated.

Figure 5A:
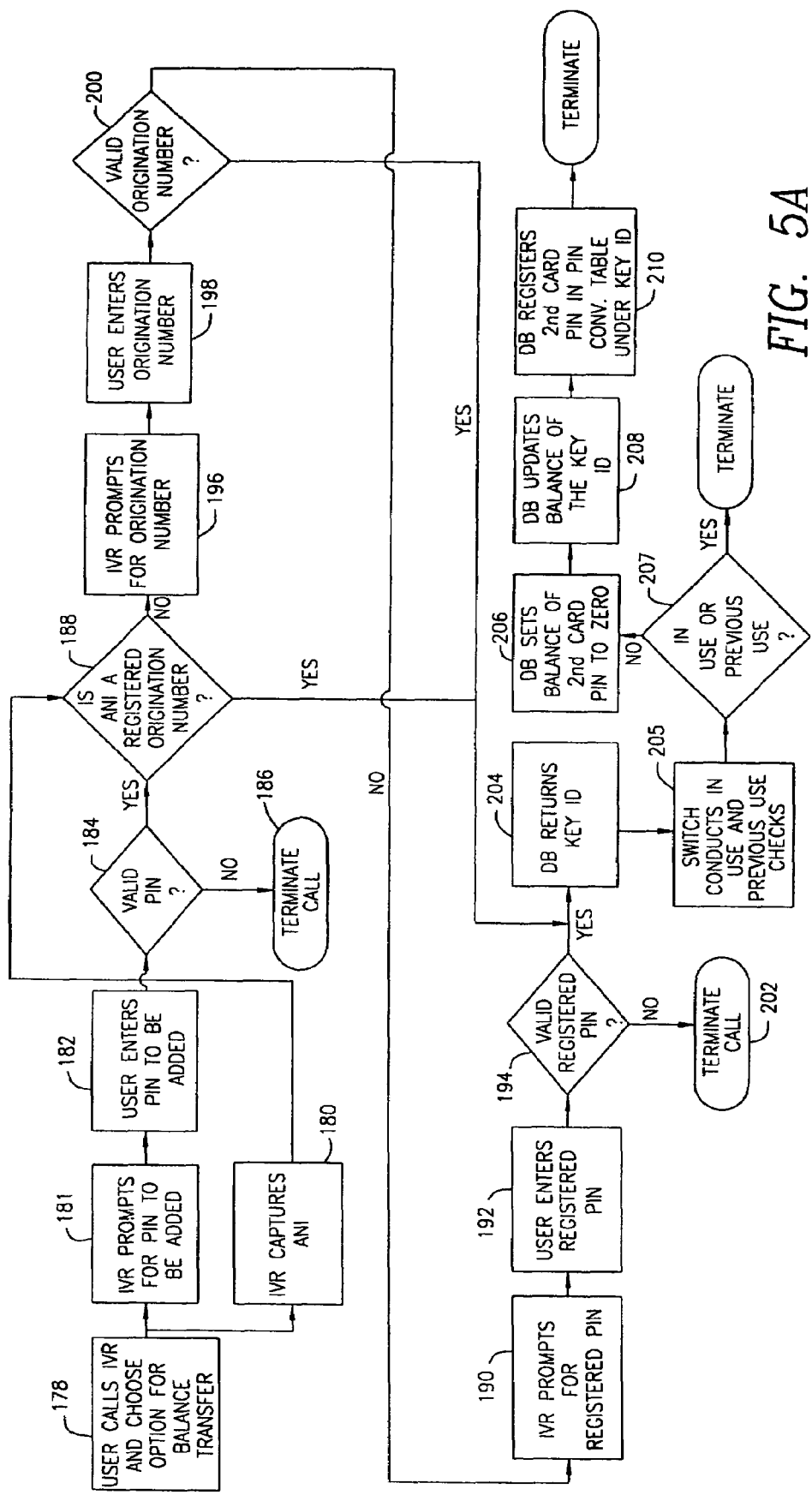
FIG. 5A is a schematic flow chart illustrating a modified version of the balance transfer process shown in FIG. 5.

If the entered origination number does not correspond to any registered origination number at step 200, the caller can then be prompted to enter a previously registered PIN (i.e., a registration number or key identifier) at step 190 in FIG. 5A. Assuming that the PIN entered by the caller is determined to be valid at the PIN verification step 194, the balance updating steps 204, 206, 208, 210 can be performed.

The Origination Number Changing Process

Figure 6:
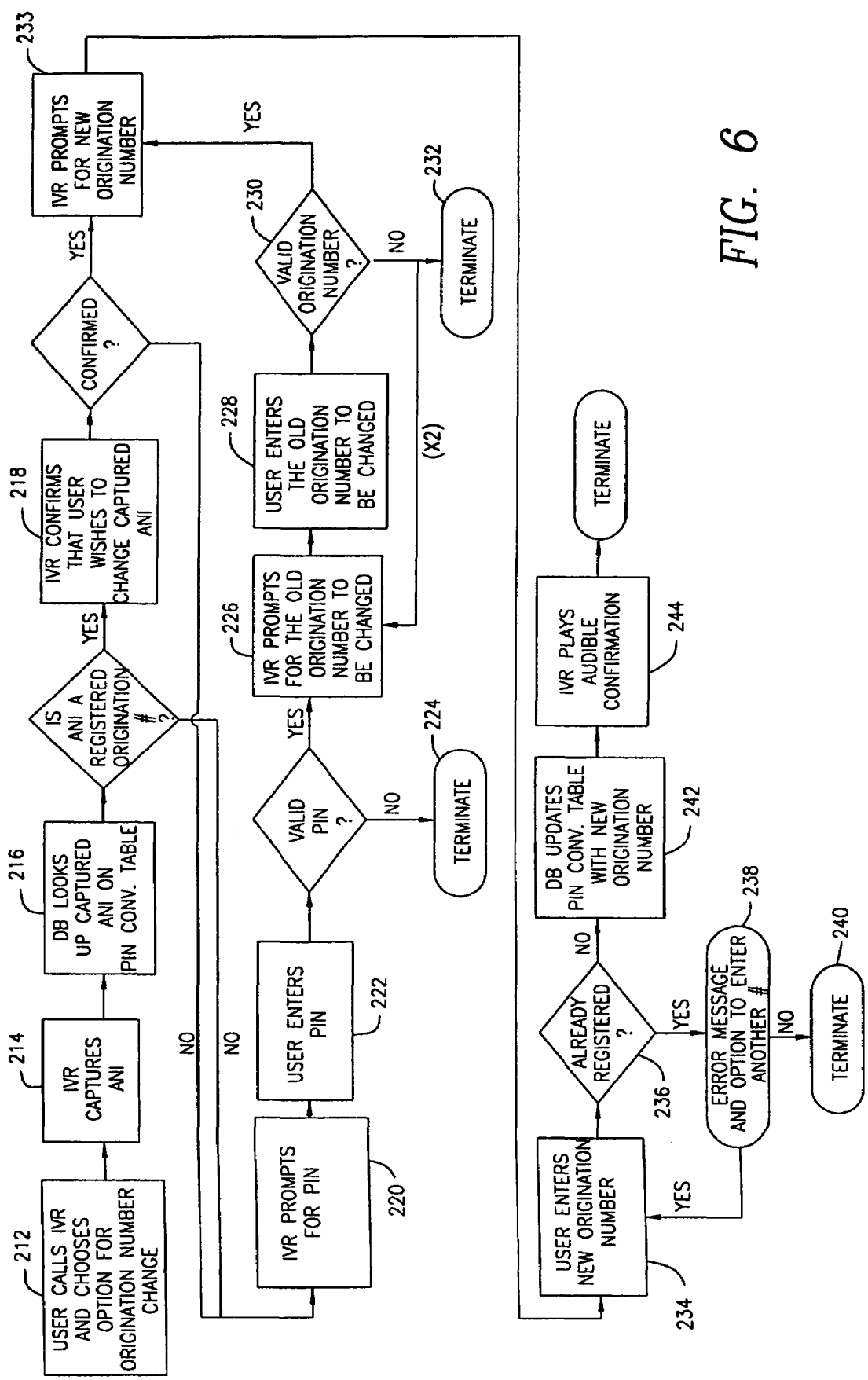
FIG. 6 is a schematic flow chart illustrating an origination number changing process of the present invention.

With reference to FIGS. 1 and 6, after the registration of an origination number, the registered origination number can be changed to another telephone number. In order to do so, the user calls the registration telephone number 38 (see FIG. 7) to be connected to the IVR unit 14 (step 212). When the call is connected, the IVR unit 14 captures the ANI of the telephone number from which the call originates (step 214). The main database server 20 then compares the captured ANI to the origination numbers registered in the ANI/PIN column 54 of the PIN conversion table 50 (step 216). If the captured ANI corresponds to a registered origination number, the IVR unit 14 asks the caller whether he or she wishes to change the registered origination number to another number (step 218). If the caller confirms, the IVR unit 14 performs origination number changing steps to be discussed hereinafter.

Still referring to FIGS. 1 and 6, if the captured ANI is determined to be invalid at step 216 or if the caller does not confirm at step 218, the IVR unit 14 then prompts the caller to enter his or her registration number (i.e., the original PIN used to register the origination number) at step 220. After the entry of a registration number by the caller (step 222), the main database server 20 determines whether the entered registration number is a valid registration number. If the entered registration number is not a valid registration number, an appropriate error message (e.g., "THE ENTERED REGISTRATION NUMBER IS INVALID") is played by the IVR unit 14, and the call is terminated or forwarded to a customer service representative (step 224).

Assuming that the entered registration number is a valid registration number, the caller is then prompted to enter the registered origination number to be changed (step 226). When the caller enters the registered origination number (step 228), the main database server 20 checks its database to determine whether the entered origination number is a valid origination number (i.e., one that is registered in the PIN conversion table 50 in connection with the entered registration number) at step 230. If the entered origination number is not a valid origination number, an appropriate error message (e.g., "THE ENTERED ORIGINATION NUMBER IS INVALID") is played by the IVR unit 14, and the caller is routed back to step 226 for re-entry of a registered origination number. If, after a predetermined number of tries, the re-entered origination number is still invalid, an appropriate error message is played by the IVR unit 14, and the call is terminated or forwarded to a customer service representative (step 232).

If the caller confirms at step 218 or if the entered origination number is determined to be valid at step 230, origination number replacement steps are performed. More particularly, the IVR unit 14 prompts the caller to enter a new origination number (step 233). After the entry of a new origination number by the caller (step 234), the main database server 20 checks the PIN conversion table 50 to determine whether the entered new origination number is already registered in connection with another PIN (step 236). If the entered new origination number is one that is already registered with another PIN, the caller is prompted with an appropriate error message (e.g., "THE ENTERED NEW ORIGINATION NUMBER IS AN ALREADY REGISTERED NUMBER") by the IVR unit 14 (step 238) and is given an option to re-try. In the event that the caller opts to retry, he or she is routed back to the new origination number entering step 234. Otherwise, the call is terminated (step 240).

Referring back to step 236, if the caller enters a new origination number that is not previously registered, the main database server 20 updates the PIN conversion table 50 by removing the original origination number and replacing same with the new origination number (step 242). The IVR unit 14 confirms that the origination number has successfully been changed (step 244), and the call is terminated.

Figure 12:
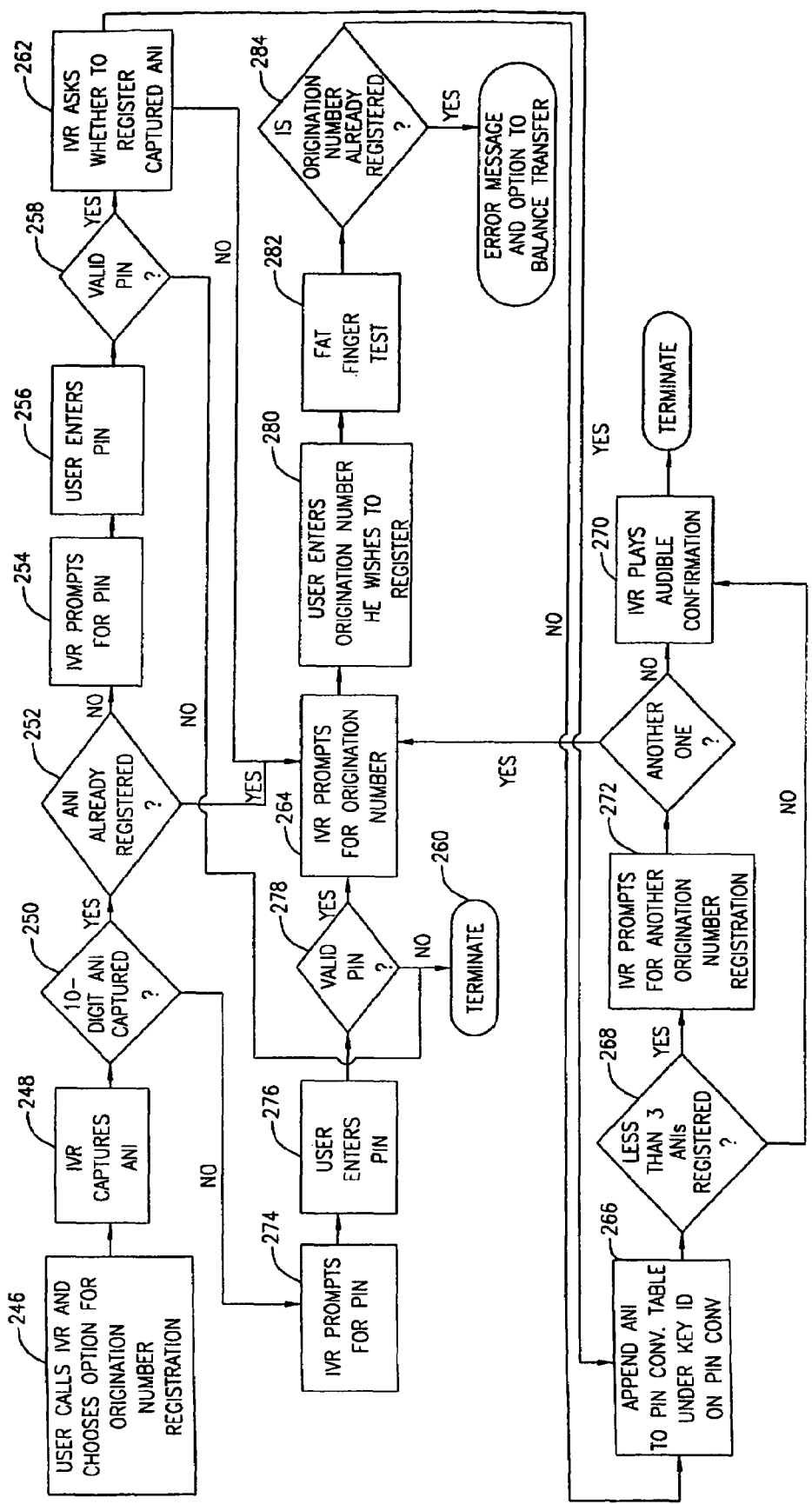
FIG. 12 is a schematic flow chart illustrating a modified version of the registration process shown in FIG. 2.
Figure 13:
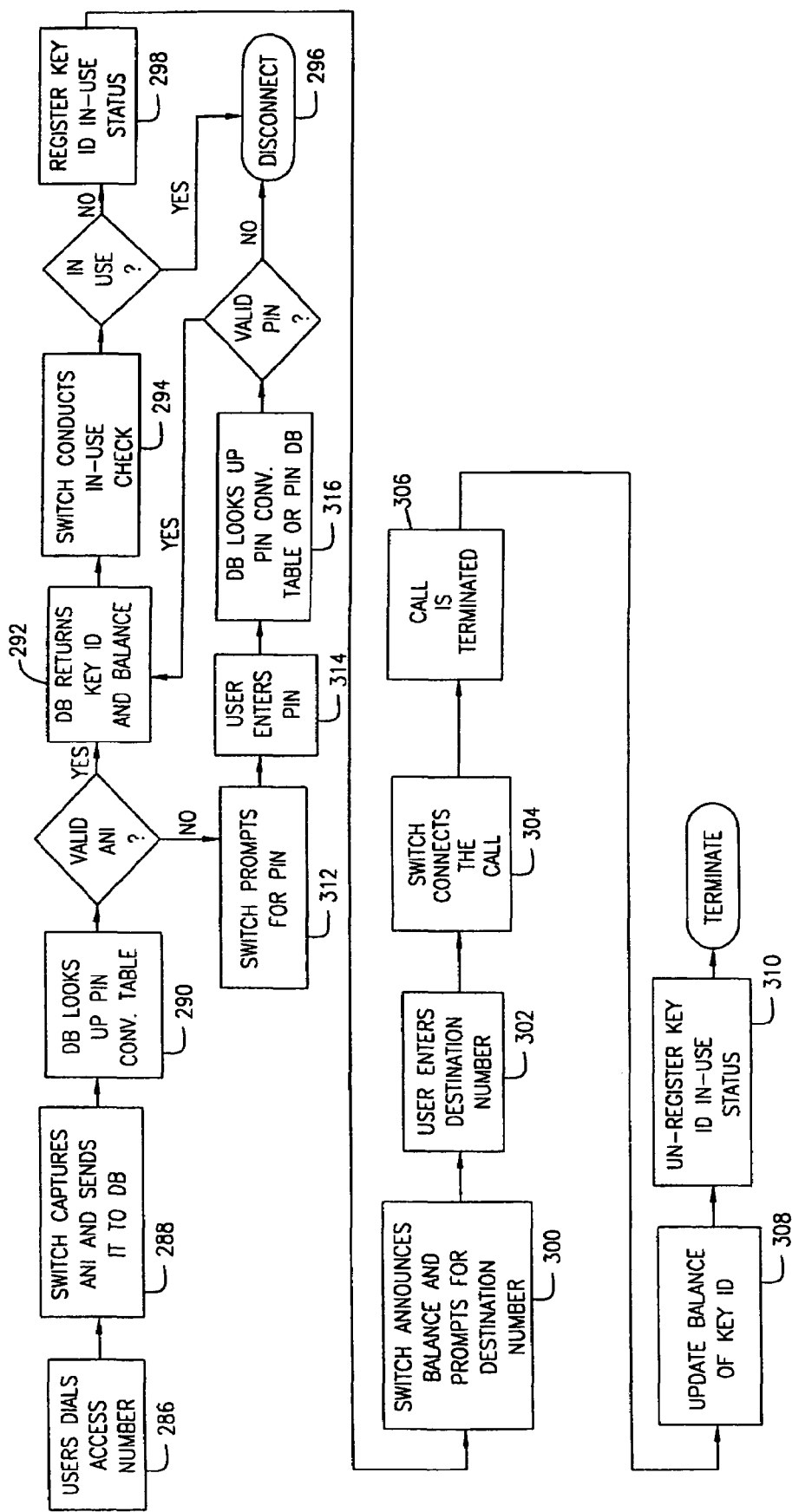
FIG. 13 is a schematic flow chart illustrating a modified version of the calling processes shown in FIGS. 3 and 4.

FIGS. 12 and 13 illustrate modified versions of the origination number registration process shown in FIG. 2 and the calling processes shown in FIGS. 3 and 4, respectively. Each of the modified processes illustrated in FIGS. 12 and 13 will be discussed hereinafter.

The Origination Number Registration Process

Referring to FIG. 12, in order to register a desired origination number A1 (e.g., a home telephone number), the registration telephone number 38 (see FIG. 7) is dialed by the cardholder from any phone or phone line (e.g., a home phone or a public pay phone) to access the IVR unit 14 of the telecommunication system 10 (see FIG. 1). When the call is connected to the IVR unit 14, the caller is prompted with various options, including an option for origination number registration. The caller then selects the origination number registration option (step 246). The IVR unit 14 then captures the ANI of the telephone number or line from which the call originates in a conventional manner (step 248). If a proper ten-digit ANI is captured by the IVR unit 14 (step 250), the captured ANI is sent by the IVR unit 14 to the main database server 20 via the WAN/LAN 22 to check whether the ANI is already registered in connection with any PIN (step 252). This checking step is performed so as to prevent the captured ANI (i.e., an origination number) from being registered in connection with multiple PINs or accounts, simplifying the administration of prepaid telephone calling card services.

Assuming that the captured ANI is not registered with any PIN, the caller is prompted to enter the PIN (e.g., the PIN P1) appearing on his or her calling card (step 254). When the PIN P1 is entered by the caller (step 256), the IVR unit 14 sends the entered PIN P1 to the main database server 20 via the WAN/LAN 22. The main database server 20 then checks its database to determine in a conventional manner whether the entered PIN P1 is valid (step 258). If the entered PIN P1 does not correspond to any PIN stored in the main database server 20, (i.e., it does not correspond to any prepaid calling account pre-established in the main database server 20), an appropriate error message (e.g., "YOUR PIN IS INVALID") is played by the IVR unit 14, and the call is terminated (step 260).

If the entered PIN P1 is a valid PIN (i.e., the entered PIN P1 corresponds to a PIN stored in the main database server 20), the caller is asked by the IVR unit 14 whether he or she wishes to register the captured ANI (step 262). If the caller elects not to do so, the call is routed to an origination number prompting step (step 264) to be discussed hereinafter. If, on the other hand, the caller elects to do so, the main database server 20 enters or creates an appropriate record in the PIN conversion table 50 (step 266). More particularly, the main database server 20 appends the captured ANI (e.g., the origination number A1) to the ANI/PIN column 54 of the PIN conversion table 50 (see FIG. 10). The main database server 20 also appends the entered PIN P1 to the registration number column 52 of the PIN conversion table 50 as a registration number or key identifier for the registered origination number A1.

After appending the PIN conversion table 50, the main database server 20 checks its database to determine whether the number of origination numbers registered for the entered PIN P1 is less than a predetermined number (e.g., 3) at step 268. This checking step is performed in order to limit the total number of origination numbers registrable in connection with any one registration number for the purpose of simplifying the administration of prepaid telephone calling card services. If the number of registered origination numbers is greater than the predetermined number, the IVR unit 14 plays an appropriate confirmation message (step 270) and then terminates the call or prompts the caller for further options (e.g., an option of making a prepaid call, a balance transfer option, etc.). Alternatively, this checking process can be eliminated.

If, on the other hand, the number of registered origination numbers is less than the predetermined number, the caller is asked by the IVR unit 14 whether he or she wishes to register another origination number (e.g., an office telephone number or line) in connection with the same PIN P1 (i.e., the registration number or the key identifier) at step 272. In the event that the caller chooses not to do so, an appropriate confirmation message is played by the IVR unit 14 (step 270), and the call is terminated. If, on the other hand, the caller elects to register another origination number, the call is routed to the origination number prompting step (step 264) to be discussed hereinafter.

Referring back to step 250, if the 10-digit ANI of the origination number (i.e., the telephone number or line from which the call originates) is not captured by the IVR unit 14, the caller is prompted to enter the PIN P1 appearing on his or her calling card (step 274). When the PIN P1 is entered by the caller (step 276), the IVR unit 14 sends the entered PIN P1 to the main database server 20 via the WAN/LAN 22. The main database server 20 then checks its database to determine whether the entered PIN P1 is valid in a conventional manner (step 278). If the entered PIN P1 is determined to be an invalid PIN (i.e., the entered PIN P1 does not correspond to any PIN stored in the main database server 20), an appropriate error message (e.g., "YOUR PIN IS INVALID") is played by the IVR unit 14, and the call is terminated (step 260). Alternatively, other options (e.g., re-entering the PIN) can be given to the caller.

Assuming that the entered PIN P1 is a valid PIN (i.e., the entered PIN P1 corresponds to a PIN stored in the main database server 20), the IVR unit 14 prompts the caller to enter a desired origination number A1 at step 264 (i.e., the telephone number the caller wishes to register for making prepaid PINless calls). After the entry of the origination number A1 by the caller (step 280), a conventional "fat finger" test (e.g., the steps of prompting a re-entry of the entered number and comparing the originally entered number to the subsequently entered number or the step of requesting confirmation of the entered number) is performed by the IVR unit 14 to confirm that the entered origination number A1 is accurate (step 282). Thereafter, the IVR unit 14 transmits the entered origination number A1 to the main database server 20. The main database server 20 then checks the PIN conversion table 50 (see FIG. 8A) containing a database of registered origination numbers to determine whether the entered origination number A1 is already registered in connection with any PIN (step 284). If the entered origination number A1 is an already registered number, an appropriate error message (e.g., "YOUR ORIGINATION NUMBER IS ALREADY REGISTERED") is played by the IVR unit 14, and the caller routed to the balance transfer steps discussed above. If the main database server 20 determines at step 284 that the entered origination number A1 is not a registered number, the PIN conversion table appending step 266 and the steps subsequent thereto (e.g., the steps 268, 272, 270) are performed as discussed above.

Referring back to step 252 and step 262, if the ANI captured by the IVR unit 14 is an already registered origination number (see step 252) or if the caller elects not to register the captured ANI (see step 262), the call is routed to the origination number entering step 264, and the steps subsequent thereto are performed as discussed above.

The Pre-Paid Calling Process

In the telecommunication system 10 discussed above, two different types of access telephone numbers (i.e., the PIN access telephone number 40 for making prepaid PIN calls and the PINless access telephone number 42 for making prepaid PINless calls) are provided for making prepaid telephone calls. The telecommunication system 10 can be modified such that only one type of access number can be provided for making both prepaid PIN calls and PINless calls. In other words, the prepaid PINless and PIN calling processes shown in FIGS. 3 and 4 can be combined into a single process. A prepaid calling process using only one type of access number will be discussed hereinbelow.

With reference to FIG. 13, the caller dials an access telephone number from any phone or phone line (i.e., either from a registered phone or a non-registered phone, such as a public pay phone) and the call is routed to the switch 30 via the PSTN 12 (step 286). When the call is connected to the switch 30, the switch 30 captures the ANI of the telephone number or line from which the call is made and transmits same to the switch database server 26 (step 288). The switch database server 26 then compares the captured ANI to the records contained in the ANI/PIN column 54 of the PIN conversion table 50 (see FIG. 10), which is downloaded from the main database server 20, for verification purposes (step 290). If the captured ANI corresponds to a registered origination number A1 or A2 (i.e., the call is made from a registered phone or phone line), the switch database server 26 transmits the corresponding key identifier P1 (i.e., the PIN P1 corresponding to the registered origination number A1 or A2 in the PIN conversion table 50) to the switch 30 along with the account balance associated therewith (step 292).

Upon receiving the key identifier P1 and the balance from the switch database server 26, the host server 28 conducts an "in-use" check for the purpose of determining whether the received key identifier P1 is in use (i.e., whether another call is in progress using the same key identifier P1) at step 294. If the key identifier P1 is in use, an appropriate error message (e.g., "YOUR PIN IS IN USE") is played by the switch 30, and the call is disconnected (step 296). If, on the other hand, the host server 28 determines that the returned key identifier P1 is not in use, it registers the key identifier P1 as being in use so as to block any subsequent prepaid calls using the key identifier P1 (step 298) while the current call is in progress. The switch 30 then informs the caller of the available account balance corresponding to the key identifier P1, and prompts the caller to enter a destination telephone number (step 300). After the entry of a destination telephone number by the caller (step 302), the switch 30 dials the entered destination telephone number and then connects the caller to the destination telephone number in a conventional manner (step 304). When the call is terminated at step 306 (e.g., by the caller), the switch database server 26 updates the balance corresponding to the key identifier P1 (step 308) and removes the key identifier P1 from the registry of key identifiers that are in use (i.e., unblocks the key identifier P1 for subsequent use) at step 310 before terminating the prepaid calling process. The call can also be terminated by the switch unit 24 in a conventional manner (e.g., when the balance runs out).

Referring back to step 290, if no ANI is captured by the switch 30 or if the captured ANI does not correspond to any origination number registered in the PIN conversion table 50 (e.g., the call is made from a non-registered phone), the switch 30 prompts the caller to enter his or her PIN (step 312). After the entry of a PIN by the caller (step 314), the switch database server 26 compares the entered PIN to its database (e.g., the PIN conversion table 50) in a conventional manner for the purpose of determining whether the entered PIN is valid (step 316). If the entered PIN is invalid (i.e., it does not correspond to any of the PINs stored in the PIN conversion table 50 or the balance table 44), an appropriate error message is played by the switch 30, and the call is disconnected (step 296). If, on the other hand, the entered PIN is a valid PIN (i.e., it corresponds to a PIN stored in the PIN conversion table 50 or the balance table 44), the switch database server 26 transmits the corresponding key identifier (e.g., the PIN P1) to the switch 30 along with the corresponding account balance (step 292). The switch 30 then connects the call to a destination telephone number entered by the user in the manner discussed hereinabove.

The various processes of the present invention discussed above can be provided as computer programs that can be resident in one or more devices, such as, without limitation, the main database server 20, the switch unit 30, the IVR unit 14 or other components of the telecommunication system 10.

It should be appreciated that the present invention provides numerous advantages over the conventional prepaid telephone calling card processes and systems discussed above. For instance, because the telecommunication system 10 allows its users to make prepaid telephone calls with or without the required PIN, it provides a user-friendly system for making prepaid telephone calls. In addition, while prepaid PINless calls are made without the PIN, because such calls needs to be made from previously registered phones, security is not compromised. The present invention also has additional user-friendly features, such as the balance transfer feature and the origination number change feature discussed hereinabove.

As indicated above, the present invention can have numerous modifications and variations. For instance, while telephone calling cards, such as the one illustrated in FIG. 7, are useful in connection with the present invention, they can be eliminated or replaced with other systems. By way of example, PINs can be issued directly to users through a computer network, such as the Internet, thereby rendering the issuance of calling cards unnecessary. While ANIs are preferred, other identifying mechanisms, systems, numbers or codes can be used in connection with the telecommunication system 10 for capturing or identifying telephone numbers or lines from which calls are made. Moreover, the balance of telephone calling cards can be replenished through a computer network, rather than through the IVR unit 14, or by way of credit card charges (e.g., automatic credit card replenishment when the balance falls below a predetermined value). The telecommunication system 10 can also be adapted for use in connection with telecommunication networks other than the PSTN 12 (e.g., the Internet). Moreover, the telecommunication system 10 can be modified in numerous ways. For example, the main database server 20 and the switch database server 26 can be combined so as to eliminate the transfer of information therebetween.

It will be understood that the embodiment described herein is merely exemplary and that a person skilled in the art may make many variations and modifications without departing from the spirit and scope of the invention. All such variations and modifications, including those discussed above, are intended to be included within the scope of the invention as defined in the appended claims.

We claim:

1. A method for providing a prepaid telephone calling card service using a call processor including an account database which has account records corresponding to a plurality of prepaid accounts, said account records including a plurality of access codes, each of which is associated with one of said accounts, each of said accounts including a balance associated therewith, said method comprising the steps of storing a plurality of registered telephone numbers in said database, each of said registered telephone numbers being associated with one of said accounts; connecting to said call processor a telephone call originated from a first telephone number; determining whether said first telephone number corresponds to one of said registered telephone numbers; if said first telephone number corresponds to said one of said registered telephone numbers, connecting said call to a second telephone number provided during said call; and transferring said balance of a first one of said accounts to said balance of a second one of said accounts, wherein said transferring step includes the steps of receiving an entry of an access code, checking whether said received access code corresponds to one of said access codes and, if said received access code corresponds to said access code of said first one of said accounts, adding said balance of said first one of said accounts to said balance of said second one of said accounts and setting said balance of said first one of said accounts to zero.

2. The method of claim 1, wherein said determining step includes the step of capturing an identifying code associated with said first telephone number.

3. The method of claim 2, wherein said determining step includes the step of determining whether said identifying code corresponds to said one of said registered telephone numbers.

4. The method of claim 3, wherein said step of connecting said call to said second telephone number is performed if said identifying code corresponds to said one of said registered telephone numbers.

5. The method of claim 1, further comprising the steps of receiving an entry of a second access code, if said first telephone number does not correspond to said one of said registered telephone numbers; and connecting said call to said second telephone number, if the second access code corresponds to one of said access codes.

6. The method of claim 1, wherein said storing step includes the step of registering a desired origination telephone number in said database as said one of said registered telephone numbers.

7. The method of claim 6, comprising the step of distributing said access codes.

8. The method of claim 7, wherein said registering step includes the steps of connecting a registration telephone call to said call processor; receiving an entry of a second access code and if the second access code corresponds to one of said access codes, registering said desired origination telephone number in said database in connection with a corresponding one of said accounts.

9. The method of claim 1, wherein said one of said registered telephone numbers includes first and second registered telephone numbers, said step of connecting said call to said second telephone number being performed if said first telephone number corresponds to one of said first and second registered telephone numbers.

10. A prepaid calling card system comprising a call processor; an account database stored in said call processor and having account records corresponding to a plurality of prepaid accounts, said account records including a plurality of access codes, each of which is associated with one of said accounts, each of said accounts including a balance associated therewith; and a plurality of registered telephone numbers contained in said database, each of said registered telephone numbers being associated with one of said accounts, said call processor being operative to receive a telephone call originated from a first telephone number, to determine whether said first telephone number corresponds to one of said registered telephone numbers and to connect said call to a second telephone number provided during said call, if said first telephone number corresponds to said one of said registered telephone numbers, wherein said call processor being operative to transfer said balance of a first one of said accounts to said balance of a second one of said accounts by receiving an entry of an access code, checking whether said received access code corresponds to one of said access codes and, if said received access code corresponds to said access code of said first one of said accounts, adding said balance of said first one of said accounts to said balance of said second one of said accounts and setting said balance of said first one of said accounts to zero.

11. The system of claim 10, wherein said call processor includes capturing means for capturing an identifying code associated with said first telephone number, said call processor being operative to determine whether said identifying code corresponds to said one of said registered telephone numbers and to connect said call to said second telephone number if said identifying code corresponds to said one of said registered telephone numbers.

12. The system of claim 10, wherein said call processor is operative to receive an entry of a second access code if said first telephone number does not correspond to said one of said registered telephone numbers, and to connect said call to said second telephone number if the second access code corresponds to one of said access codes.

13. The system of claim 10, said call processor is operative to receive a second telephone call originating from a third telephone number, to receive an entry of a second access code during said second call, and to connect said second call to a fourth telephone number provided during said second call if the second access code corresponds to one of said access codes.

14. The system of claim 13, wherein said database includes a conversion table having a first field, which contains a first set of said access codes, and a second field, which contains a second set of said access codes and said registered telephone numbers, each of said second set of said access codes and said registered telephone numbers being associated with one of said first set of said access codes.

15. The system of claim 10, wherein said call processor is operative to receive a registration telephone call from a third telephone number, to receive an entry of a second access code and, if the second access code corresponds to one of said access codes, to register a desired origination telephone number in said database as said one of said registered telephone numbers.

16. The system of claim 15, wherein said call processor is operative to capture an identifying code of said third telephone number during said registration call and to register said identifying code of said third telephone number in said database as said one of said registered telephone numbers if said identifying code is captured during said registration call.

17. The system of claim 16, wherein said call processor is operative to receive an entry of an origination telephone number if said identifying code of said third telephone number is not captured during said registration call, and to register the received origination telephone number in said database as said one of said registered telephone numbers.

18. The system of claim 10, wherein said call processor is operative to change said one of said registered telephone numbers to a different registered telephone number.

19. The system of claim 18, wherein said call processor is operable to receive a second telephone call, to receive an entry of said different telephone number, and to update said database so as to change said one of said registered telephone numbers to said different telephone number.

20. A prepaid calling card system comprising a call processor having an access telephone number associated therewith; an account database stored in said call processor and having account records corresponding to a plurality of prepaid accounts, said account records including a plurality of access codes, each of which is associated with one of said accounts, each of said accounts including a balance associated therewith; and a plurality of registered telephone numbers contained in said database, each of said registered telephone numbers being associated with one of said accounts, said call processor being operative to receive a telephone call originated by a caller from a first telephone number and directed by said caller to said access telephone number, to determine whether said first telephone number corresponds to one of said registered telephone numbers, and to connect said call to a second telephone number provided during said call, if said first telephone number corresponds to said one of said registered telephone numbers, said call processor being operative to transfer said balance of a first one of said accounts to said balance of a second one of said accounts by receiving an entry of an access code, determining whether the received access code corresponds to one of said access codes and, if said received access code corresponds to said access code of said first one of said accounts, adding said balance of said first one of said accounts to said balance of said second one of said accounts and setting said balance of said first one of said accounts to zero.

21. The system of claim 20, wherein said database includes a conversion table having a first field and a second field, said call processor being operative to add said access code of said first one of said accounts and said access code of said second one of said accounts to said first and second fields, respectively, thereby associating said access code of said first one of said accounts with said access code of said second one of said accounts such that prepaid telephone calls can be made with the use of said access code of said first one of said accounts even if said balance of said first one of said account is set to zero.

22. The system of claim 21, wherein said call processor is operative to append said one of said registered telephone numbers to said first field of said conversion table such that said one of said registered telephone numbers is associated with said access code of said second one of said accounts.

23. A prepaid calling card system for providing a prepaid telephone calling card service using a call processor having an access telephone number associated therewith and an account database having account records corresponding to a plurality of prepaid accounts, said account records including a plurality of access codes, each of which is associated with one of said accounts, each of said accounts including a balance associated therewith, said prepaid calling card system comprising a computer-readable media having computer-executable instructions stored thereon for causing the performance of the following steps:

providing a plurality of registered telephone numbers stored in the database and each associated with at least one of said accounts;

receiving at said call processor a telephone call originated from a first telephone number by a caller and directed by said caller to said access telephone number;

receiving at said call processor a caller-provided telephone number;

determining if the first telephone number corresponds to one of the plurality of registered telephone numbers;

if the first telephone number corresponds to one of the plurality of registered telephone numbers, connecting said telephone call to the caller-provided telephone number; and transferring said balance of a first one of said accounts to said balance of a second one of said accounts.

wherein said transferring step is performed by receiving an access code, determining whether said received access code corresponds to one of said access codes and, if said received access code corresponds to said access code of said first one of said accounts, adding said balance of said first one of said accounts to said balance of said second one of said accounts and setting said balance of said first one of said accounts to zero.

24. A method for providing a prepaid telephone calling card service using a call processor including an account database which has account records corresponding to a plurality of prepaid accounts, said account records including a plurality of access codes, each of which is associated with one of said accounts, each of said accounts including a balance associated therewith, said method comprising the steps of storing a plurality of registered telephone numbers in said database, each of said registered telephone numbers being associated with one of said accounts; connecting to said call processor a first telephone call originated from a first telephone; determining whether said first telephone number corresponds to one of said registered telephone numbers; if said first telephone number corresponds to said one of said registered telephone numbers, connecting said first call to a second telephone number provided during said call; and transferring said balance of a first one of said accounts to said balance of a second one of said accounts, said transferring step including the step of associating said access code of said first one of said accounts with said access code of said second one of said accounts such that a second telephone call can be made after the performance of said transferring step by providing said access code of said first one of said accounts to said call processor.

25. The method of claim 24, wherein a charge relating to said second call is deducted from said balance of said second one of said accounts.

26. The method of claim 25, wherein said database includes a conversion table having a first field and a second field; and wherein said access code of said first one of said accounts and said access code of said second one of said accounts are added to said first and second fields, respectively, during the performance of said transferring step so as to associate said access code of said first one of said accounts with said access code of said second one of said accounts.

27. A prepaid calling card system comprising a call processor; an account database stored in said call processor and having account records corresponding to a plurality of prepaid accounts, said account records including a plurality of access codes, each of which is associated with one of said accounts, each of said accounts includes a balance associated therewith; and a plurality of registered telephone numbers contained in said database, each of said registered telephone numbers being associated with one of said accounts, said call processor being operative to receive a first telephone call originated from a first telephone number, to determine whether said first telephone number corresponds to one of said registered telephone numbers and to connect said first call to a second telephone number provided during said call, if said first telephone number corresponds to said one of said registered telephone numbers, wherein said call processor being operative to transfer said balance of a first one of said accounts to said balance of a second one of said accounts and to associate said access code of said first one of said accounts with said access code of said second one of said accounts such that a second telephone call can be made after the transfer of said balance of said first one of said accounts to said balance of said second one of said accounts by providing said access code of said first one of said accounts to said call processor.

28. The system of claim 27, wherein a charge relating to said second call is deducted from said balance of said second one of said accounts.

29. The system of claim 28, wherein said database includes a conversion table having a first field and a second field; and wherein said access code of said first one of said accounts and said access code of said second one of said accounts are added to said first and second fields, respectively, so as to associate said access code of said first one of said accounts with said access code of said second one of said accounts.

* * * * *